US006710946B2

United States Patent
Hori (10) Patent No.: US 6,710,946 B2
(45) Date of Patent: Mar. 23, 2004

(54) LENS HOLDER HAVING AN ADJUSTMENT GROOVE OF A TAPER SHAPE

(75) Inventor: Ken'ichi Hori, Kawasaki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/352,622

(22) Filed: Jan. 28, 2003

(65) Prior Publication Data

US 2003/0142419 A1 Jul. 31, 2003

(30) Foreign Application Priority Data

Jan. 29, 2002 (JP) .......................... 2002-020312

(51) Int. Cl.$^7$ ................................. G02B 7/02
(52) U.S. Cl. ...................... 359/819; 359/822
(58) Field of Search ................. 359/819, 822, 359/823, 824

(56) References Cited

U.S. PATENT DOCUMENTS 4,596,449 A * 6/1986 Iwata et al. ............ 359/696

* cited by examiner

Primary Examiner—Ricky Mack
(74) Attorney, Agent, or Firm—Frishauf, Holtz, Goodman & Chick, P.C.

(57) ABSTRACT

Disposed in a corner portion formed by a base plate (122) and a vertical wall (124) with being always pressed against the corner portion by a presser bar spring (16), a lens holder (14A) has an adjustment groove (14Aa) extending in a direction perpendicular to the vertical wall. The adjustment groove (14Aa) has a taper shape where a width thereof becomes narrower in proportion to near to the vertical wall and the width thereof becomes wider in proportion to apart from the vertical wall. By moving an adjustment pin (18a) with the adjustment pin inserted in the adjustment groove (14Aa) through a hole (122b) formed in the base plate, the lens holder is moved along an optical axis (OA) of a laser beam, thereby adjusting a position of a beam spread lens (BSL) without a center axis (CA) thereof out of the optical axis.

2 Claims, 11 Drawing Sheets

RELATED TECHNIQUE

FIG. 5
RELATED TECHNIQUE

FIG. 6
RELATED TECHNIQUE

LENS HOLDER HAVING AN ADJUSTMENT GROOVE OF A TAPER SHAPE

This application claims priority to prior application JP 2002-20312, the disclosure of which is incorporated herein by reference.

BACKGROUND OF THE INVENTION

This invention relates to an optical pickup unit, which is contained in an optical disc drive, for recording/reproducing data in/from an optical recording medium such as an optical disc and, in particular, to a lens holder for fitting a lens installed in an optical base of the optical pickup unit.

In the manner known in the art, an optical pickup unit (which is also called "OPU") is a unit for converging a laser beam produced by a semiconductor laser serving as an optical source on a signal recording surface of an optical disc through an objective lens and for detecting a return beam from the signal recording surface by a photo detector serving as optical detecting means.

The optical pickup unit comprises various optical parts which are installed in an optical base. There is a lens called a beam spread lens as one of the optical parts.

On assembling the optical pickup unit, in order to correct degradation of an optical characteristic caused by assembling errors, it is well adopted (used) a method of adjusting a position of the beam spread lens and of fixing the beam spread lens in the optical base using adhesive. Inasmuch as the beam spread lens has a concave surface, it is difficult to adjust the position of the beam spread lens as it is. Accordingly, by fitting the beam spread lens in a lens holder having a shape which is easy to adjust a position and by adjusting the position of the lens holder, it results in adopting a method of adjusting the position of the beam spread lens.

Figure 12A:
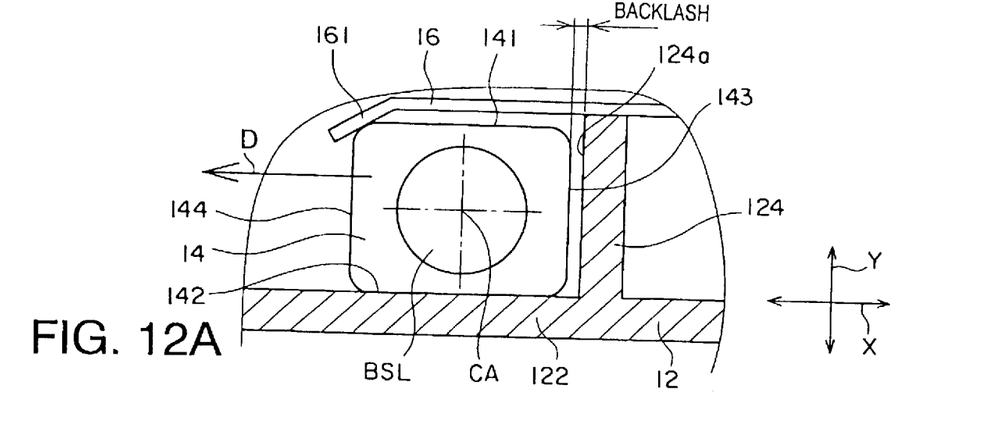
FIG. 12A is a fragmentary section view of a part of the known lens holder taken in the direction of the arrow B of FIG. 5 for use in describing problems of the known lens holder.

In the manner which will later be described in conjunction with FIGS. 12A and 12B, it is difficult for a known lens holder to move the lens holder only along an optical axis. As a result, a center axis of the beam spread lens is out of the optical axis on adjusting the position of the beam spread lens. Accordingly, an optical characteristic of the optical pickup unit is degraded.

SUMMARY OF THE INVENTION

It is therefore an object of this invention to provide a lens holder in which a center axis of a lens is not out of an optical axis on adjusting a position of the lens.

It is another object of this invention to provide a lens holder of the type described, which is capable of manufacturing an optical pickup unit having a good optical characteristic.

Other objects of this invention will become clear as the description proceeds.

On describing the gist of this invention, it is possible to be understood that a lens holder is for fitting a lens installed in an optical base of an optical pickup unit. The optical base comprises a base plate and a vertical wall perpendicularly extending upwards from the base plate. The lens holder is disposed in a corner portion formed by the base plate and the vertical wall. The lens holder is always pressed against the corner portion by a presser bar spring. The lens holder has an adjustment groove extending in a direction perpendicular to the vertical wall. The lens holder is moved along an optical axis of a laser beam by moving an adjustment pin with the adjustment pin inserted in the adjustment groove through a hole formed in the base plate, thereby adjusting a position of the lens. According to an aspect of this invention, the adjustment groove has a taper shape where a width thereof becomes narrower in proportion to near to the vertical wall and the width thereof becomes wider in proportion to apart from the vertical wall.

The afore-mentioned lens holder, the lens may be, for example, a beam spread lens for use in the optical pickup unit.

DESCRIPTION OF THE PREFERRED EMBODIMENT

Figure 1:
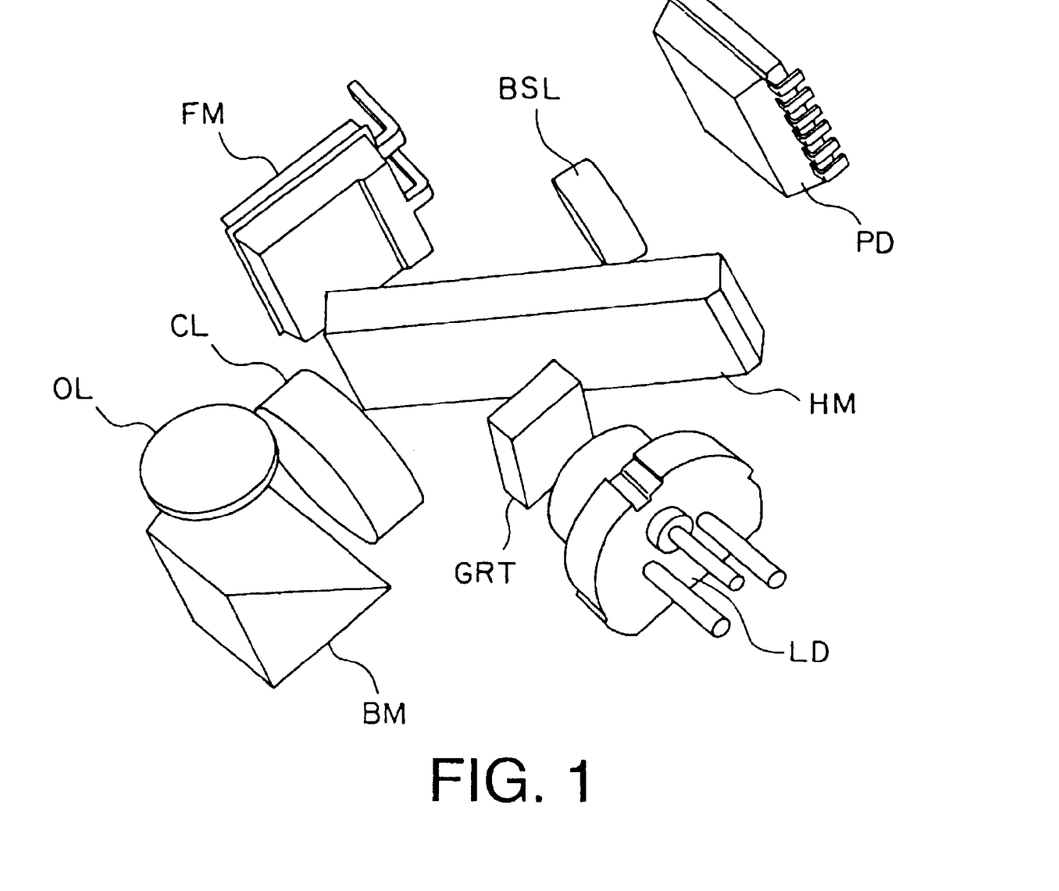
FIG. 1 is a perspective view showing an optical system of an optical pickup unit to which this invention is applicable.
Figure 2:
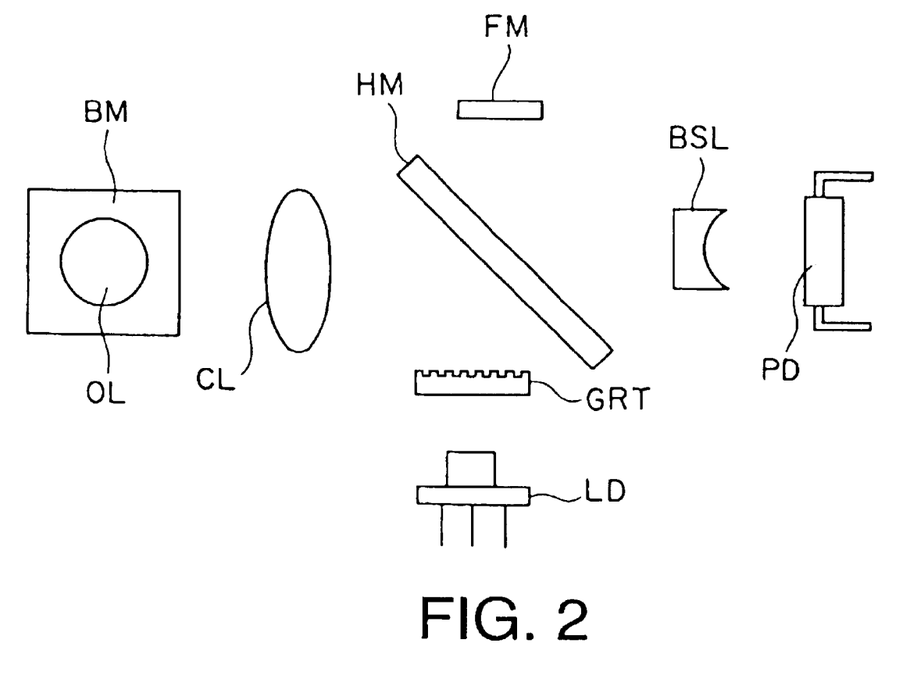
FIG. 2 is a plan view showing the optical system of the optical pickup unit illustrated in FIG. 1.
Figure 3:
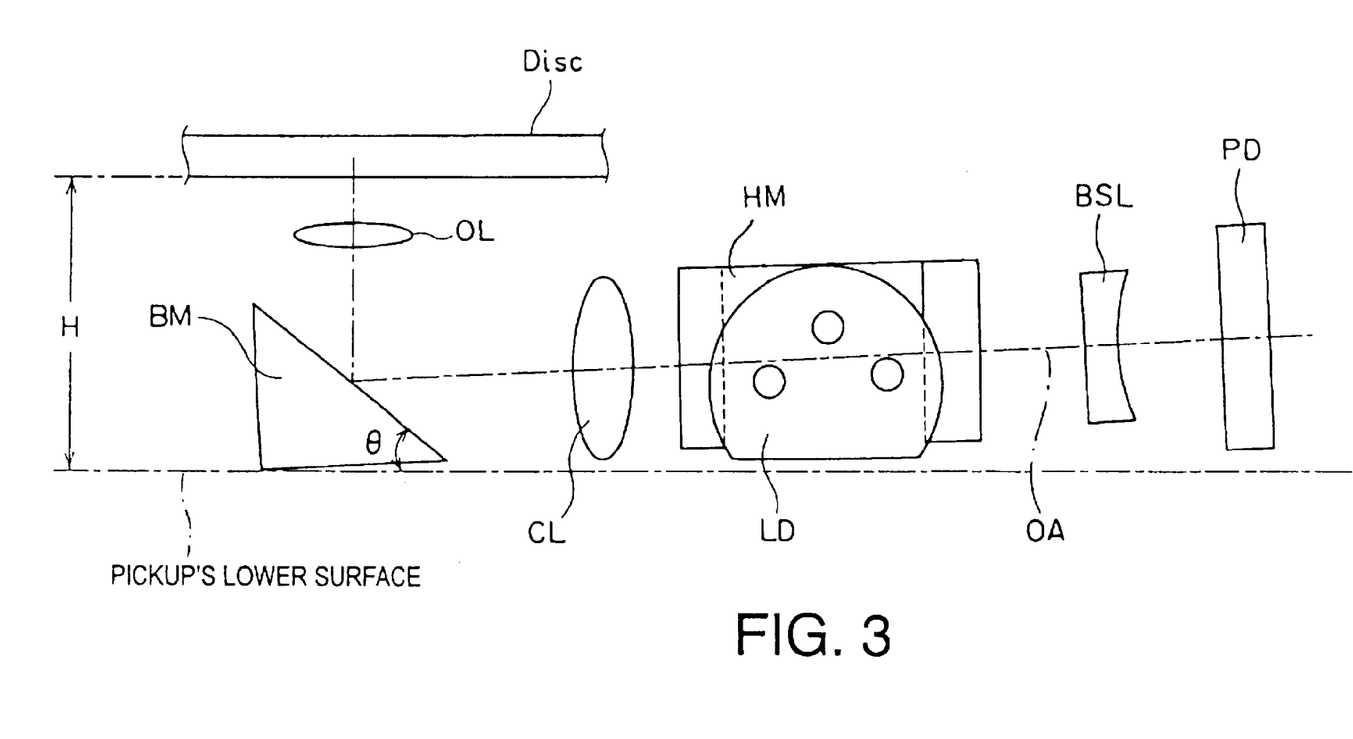
FIG. 3 is a front view showing the optical system of the optical pickup unit illustrated in FIG. 1.

Referring to FIGS. 1 through 3, the description will proceed to an optical pickup unit to which this invention is applicable. FIG. 1 is a perspective view of an optical system of the optical pickup unit. FIG. 2 is a plan view showing the optical system of the optical pickup unit. FIG. 3 is a front view showing the optical system of the optical pickup unit.

The illustrated optical pickup unit comprises a semiconductor laser (laser diode) LD, a diffraction grating GRT, a half mirror HM, a collimator lens CL, a boosting mirror BM, an objective lens OL, a beam spread lens BSL, a photo detector (light receiving element) PD, and a front monitor FM. In addition, a reference symbol of Disc designates an optical disc.

A boosting or included angle $\theta$ between a reflecting surface of the boosting mirror BM and a pickup's lower surface is smaller than 45 degrees. In addition, as shown in FIG. 3, the optical parts comprising the semiconductor laser LD, the photo detector PD, the diffraction grating GRT, the collimator lens CL, the half mirror HM, the beam spread lens BSL, and the front monitor FM are arranged with these optical parts inclined for an optical base (which will later be described) so that these optical parts are not jutted out the pickup's lower surface downwards.

Figure 4:
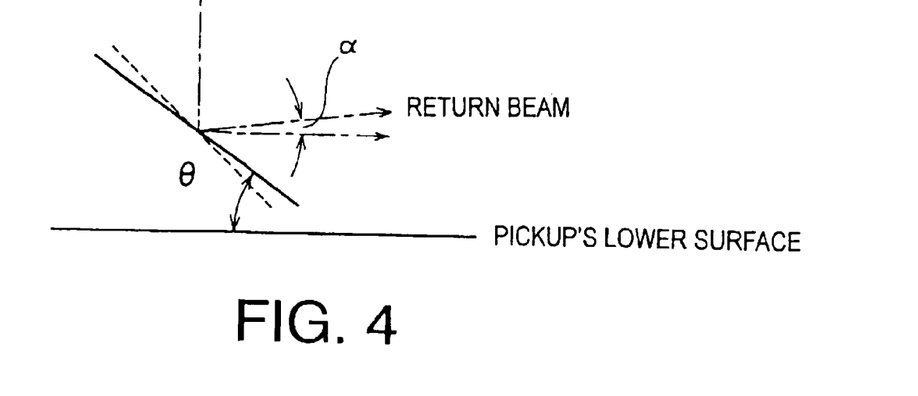
FIG. 4 is a view showing a relationship between a boosting angle of a reflecting surface of a boosting mirror for use in the optical pickup unit illustrated in FIG. 1.

FIG. 4 illustrates a relationship between the boosting angle $\theta$ of the reflecting surface of the boosting mirror BM shown in FIG. 3. Inasmuch as the boosting angle $\theta$ of the reflecting surface of the boosting mirror BM is smaller than 45 degrees, an optical axis of both of an incident laser beam for the boosting mirror BM and a return beam reflected by the boosting mirror BM inclines to upwards for the pickup's lower surface by an angle $\alpha$. This angle $\alpha$ is represented by as follows:

$$\alpha = 90° - 2\theta.$$

Referring now to FIGS. 1 through 3, description will be made as regards operation of the optical pickup unit illustrated in FIGS. 1 through 3.

Disposed this side, the semiconductor laser LD radiates a laser beam in a forward direction with the laser beam inclined to downwards for a horizontal surface (the pickup's lower surface) by the angle $\alpha$. The outgoing laser beam is separated into three laser beams by the diffraction grating GRT (FIGS. 1 and 2) and is bent at a right angle by the half mirror HM to go leftward with the three laser beams inclined to downwards for the horizontal surface by the angle $\alpha$. In addition, the half mirror HM separates the incident laser beam into a reflected beam and a transmitted beam at a constant ratio. For example, the half mirror HM reflects 80% of the incident laser beam as the reflected beam and transmits 20% of the incident laser beam as the transmitted beam. The front monitor FM (FIGS. 1 and 2) monitors a light amount of the transmitted beam from the half mirror HM. The laser beam, which goes leftward with inclined to downwards for the horizontal surface by the angle $\alpha$, is collimated into a collimated beam by the collimator lens CL and thereafter is bent at a right angle by reflecting at the reflecting surface of the boosting mirror BM to go vertically upward. The laser beam, which goes vertically upward, is converged (irradiated) on a signal recording surface of the optical disk Disc through the objective lens OL.

Reflected by the signal recording surface of the optical disk Disc, a reflected beam (return beam) goes vertically downward, passes through the objective lens OL, and is bent at a right angle by reflecting the reflecting surface of the boosting mirror BM to go rightward with the return beam inclined to upwards for the horizontal surface by the angle $\alpha$. The return beam, which goes rightward with inclined to upwards for the horizontal surface by the angle $\alpha$, is detected by the photo detector PD through the collimator lens CL, the half mirror HM, and the beam spread lens BSL.

In addition, the semiconductor laser LD, the diffraction grating GRT, the half mirror HM, the collimator lens CL, the boosting mirror BM, the beam spread lens BSL, the photo detector PD, and the front monitor FM are held in an optical base which will later be described. Furthermore, the objective lens OL is held by a lens holder (not shown) which is supported to the optical base so as to be slightly movable. The pickup's lower surface is a lower surface of the optical base.

Figure 5:
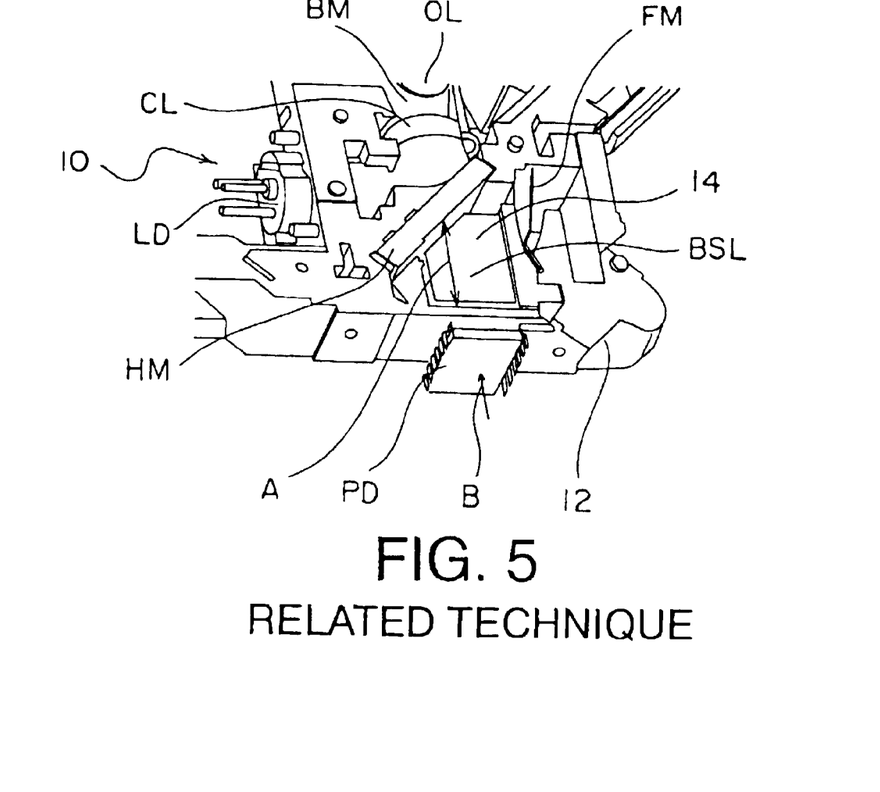
FIG. 5 is a perspective view showing the outside appearance of a known optical pickup unit.
Figure 6:
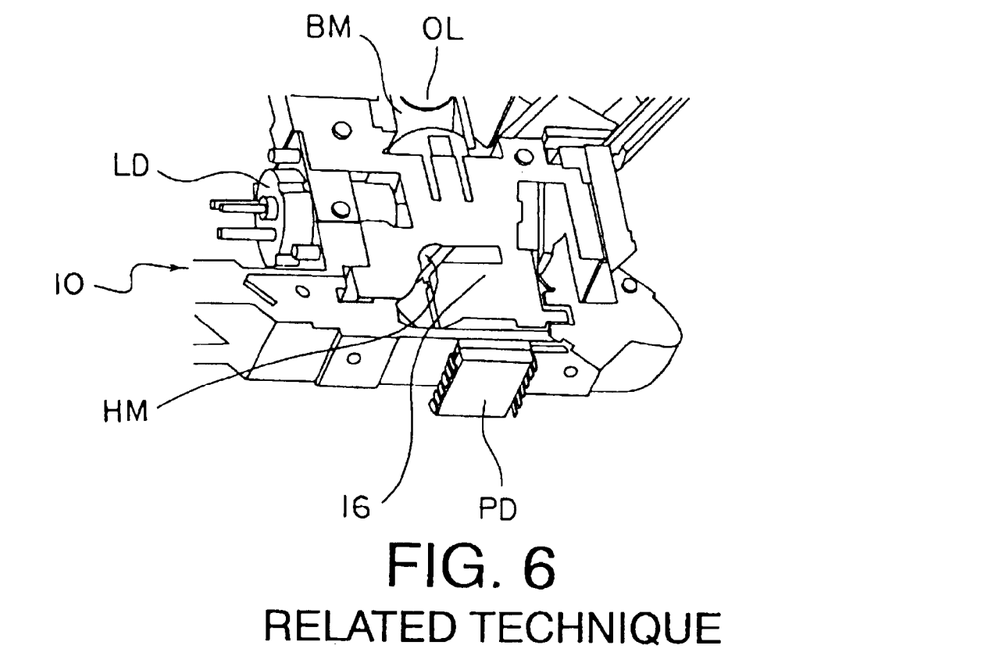
FIG. 6 is a perspective view showing the outside appearance of the known optical pickup unit illustrated in FIG. 5.

FIGS. 5 and 6 show the exterior of a known optical pickup unit 10. The optical pickup unit 10 comprises the above-mentioned optical base depicted at 12 in which the above-mentioned optical parts are installed.

As shown in FIG. 5, the beam spread lens BSL is fitted in a known lens holder 14. The lens holder 14 is pressed down by a presser bar spring 16 as shown in FIG. 6, and is mounted on the optical base 12. The lens holder 14 has degree of freedom only in a direction shown in an arrow A in FIG. 5 and allows the lens holder 14 to move in the direction A.

Figure 7:
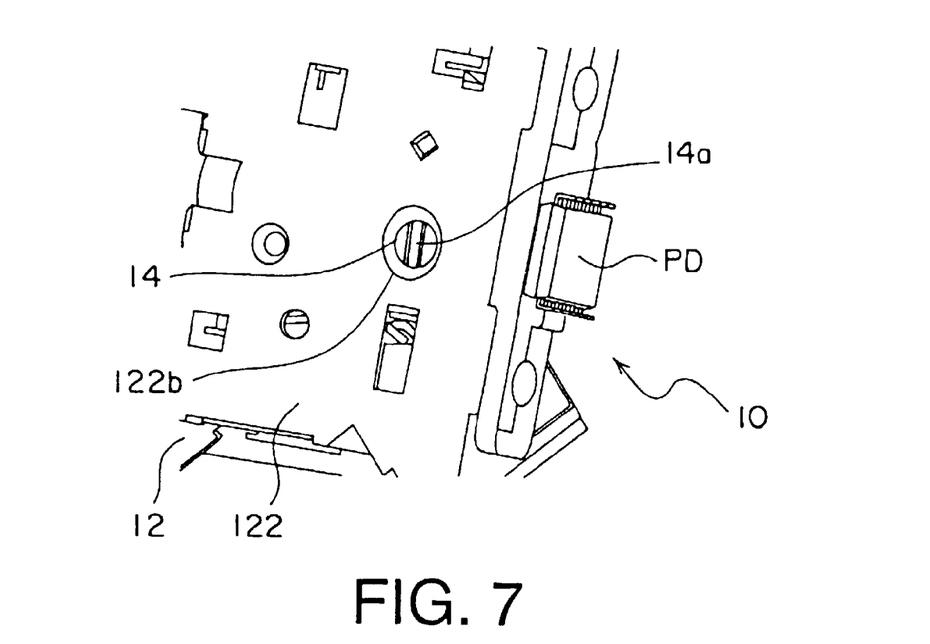
FIG. 7 is a perspective view showing the known optical pickup unit illustrated in FIG. 5 seen from a bottom side.
Figure 8:
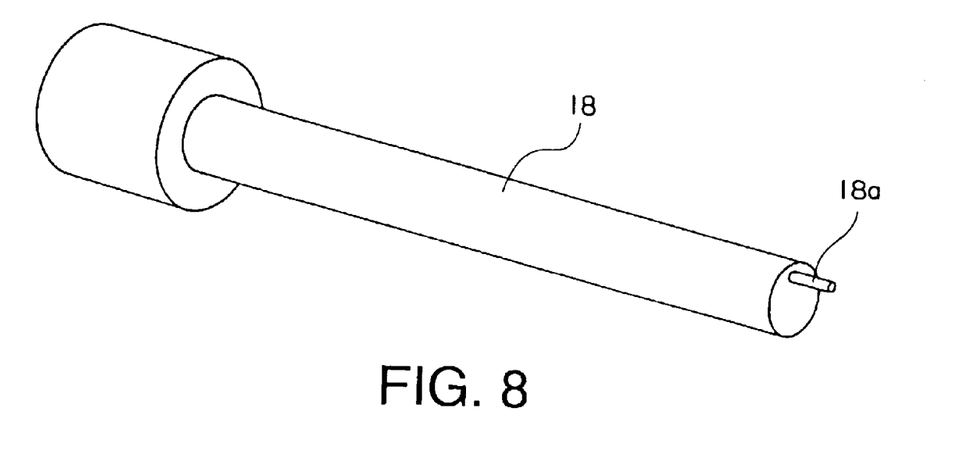
FIG. 8 is a perspective view showing the outside appearance of an adjustment jig having an adjustment pin inserted in an adjustment groove of a lens holder.

The lens holder 14 has a rear surface (a lower surface) in which an adjustment groove 14 is formed as shown in FIG. 7. In the adjustment groove 14, an adjustment pin 18a of an adjustment jig 18 as illustrated in FIG. 8 is inserted. The adjustment jig 18 comprises a solid cylindrical body having a tip part to which the adjustment pin 18a is eccentrically attached.

Figure 9A:
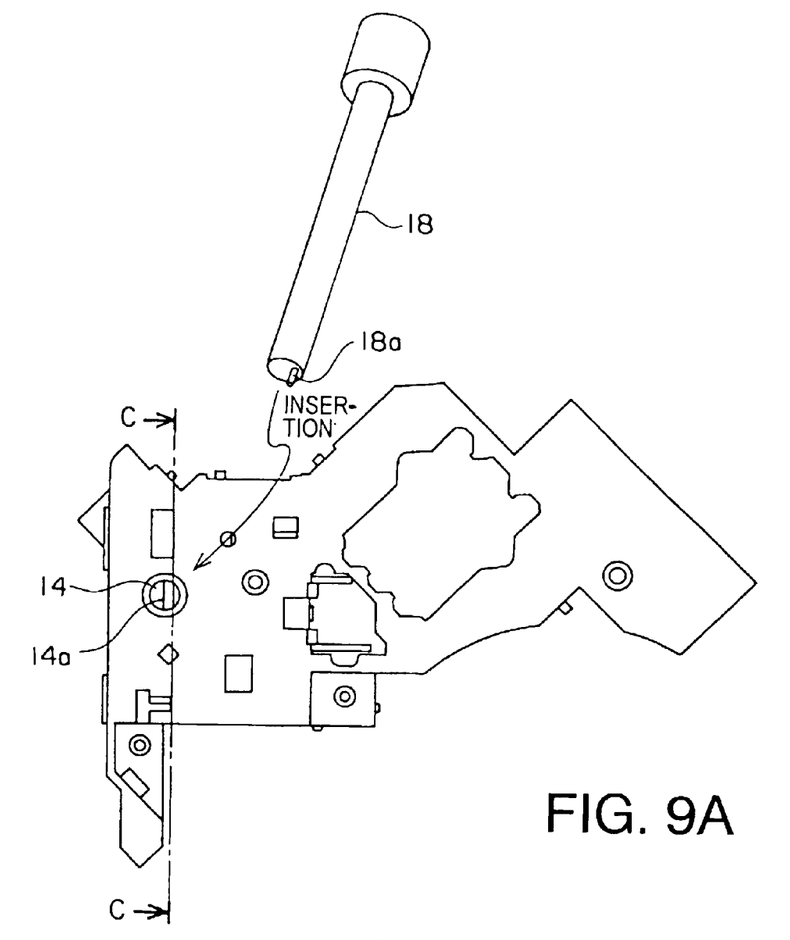
FIG. 9A is a rear view showing a state where the adjustment pin of the adjustment jig is inserted in the adjustment groove of the lens holder.
Figure 9B:
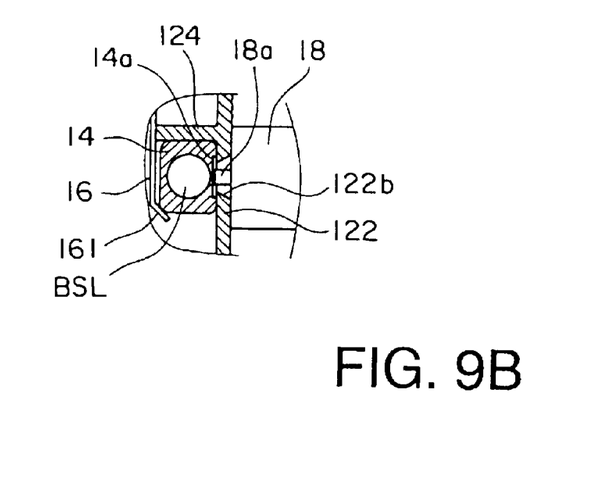
FIG. 9B is a cross-sectional view taken on line C—C of FIG. 9A.

FIGS. 9A and 9B collectively show a state where the adjustment pin 18a of the adjustment jig 18 is inserted in the adjustment groove 14a of the lens holder 14. FIG. 9A is a rear view showing the state where the adjustment pin 18a of the adjustment jig 18 is inserted in the adjustment groove 14a of the lens holder 14. FIG. 9B is a cross-sectional view taken on line C—C of FIG. 9A.

Figure 10A:
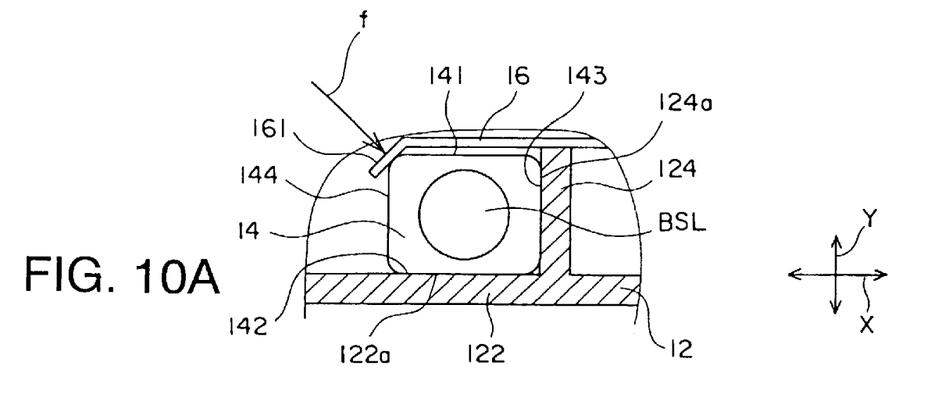
FIG. 10A is a fragmentary section view of a part of a known lens holder taken in a direction of an arrow B of FIG. 5 for use in describing an arrangement relationship among an optical base, the known lens holder, and a presser bar spring.
Figure 10B:
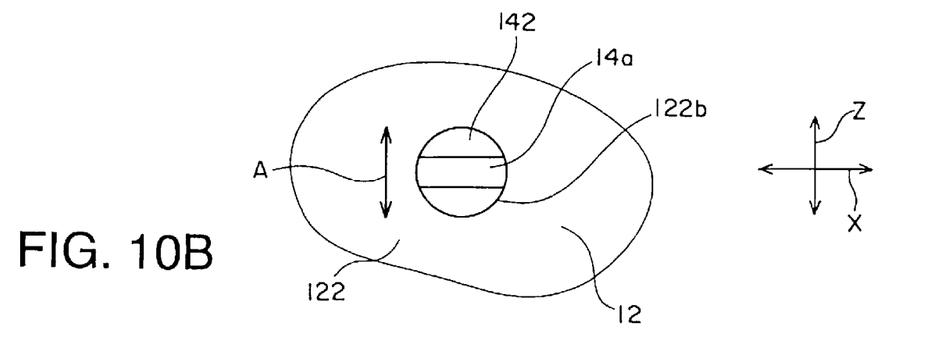
FIG. 10B is a fragmentary view of the part of the known lens holder seen from a bottom side for use in describing the arrangement relationship between the optical base and the known lens holder.

Referring to FIGS. 10A and 10B, the description will be directed to an arrangement relationship among the optical base 12, the lens holder 14, and the presser bar spring 16. FIG. 10A is a sectional view of the lens holder 14 seen from a direction of an arrow B in FIG. 5. FIG. 10B is a rear view of a part of the lens holder 16.

As shown in FIG. 10A, the optical base 12 comprises a base plate 122 and a vertical wall 124 perpendicularly extending upwards from the base plate 122. The lens holder 14 is disposed in a corner portion formed by the base plate 122 and the vertical wall 124 as shown in FIG. 10A. More specifically, the lens holder 14 has a shape of a square pole having a substantially rectangular section. The lens holder 14 has an upper face 141, a lower face 142, a right-hand face 143, and a left-hand face 144. The right-hand face 143 of the lens holder 14 is slidably in contact with one vertical face 142a of the vertical wall 142 while the lower face 142 of the lens holder is slidably in contact with a surface (an upper face or a horizontal face) 122a of the base plate 122. The vertical face 142a of the vertical wall 142 is called an X reference face while the surface 122a of the base plate 122 is called a Y reference face.

On the other hand, the presser bar spring 16 extends from the vertical wall 124 at an upper end thereof rightwards in parallel with the base plate 122. The presser bar spring 16 has a tip 161 bent downwards at an obtuse angle. The tip 161 of the presser bar spring 16 is contact with a corner portion where the upper face 141 and the left-hand face 144 of the lens holder 14 intersect each other as shown in FIG. 10A, thereby pressing, by pressing force f, the right-hand face 143 and the lower face 142 of the lens holder 14 against the X reference face 124a and the Y reference face 122a, respectively. That is, the lens holder 14 is pressed down by the presser bar spring 16 and a movement of the lens holder 14 is restricted in an X direction (right and left perpendicular to the X reference face 124a) and in a Y direction (up and down perpendicular to the Y reference face 122a).

As shown in FIG. 10B, the base plate 122 of the optical base 12 has a circular hole 122b at a portion where the lens holder 14 is mounted. The adjustment groove 14a of the lens holder 14 exposes from the circular hole 122b. The adjustment groove 14a extends right and left (in the X direction). The adjustment groove 14a has a width which is substantially equal to a diameter of the adjustment pin 18a of the adjustment jig 18.

Figure 11A:
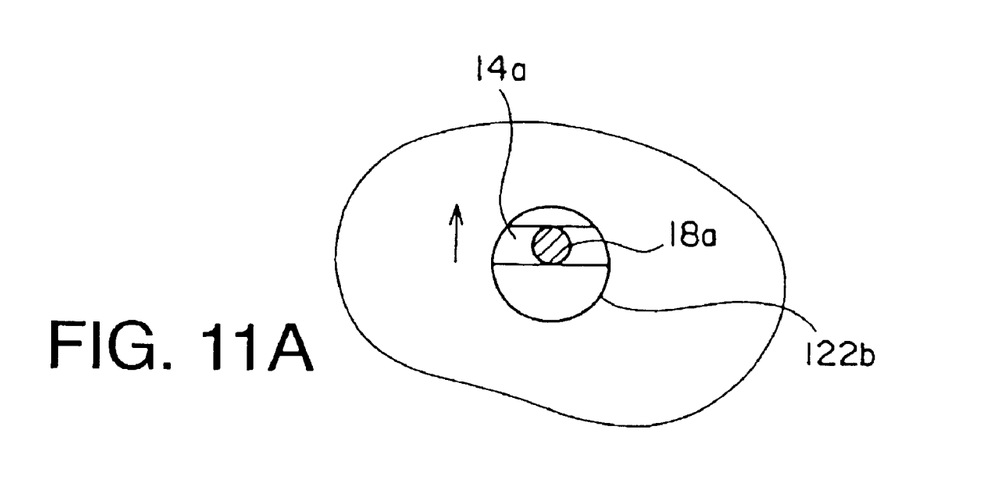
FIGS. 11A and 11B are partial enlarged bottom views showing a movement of the adjustment groove of the known lens holder on position adjustment.
Figure 11B:
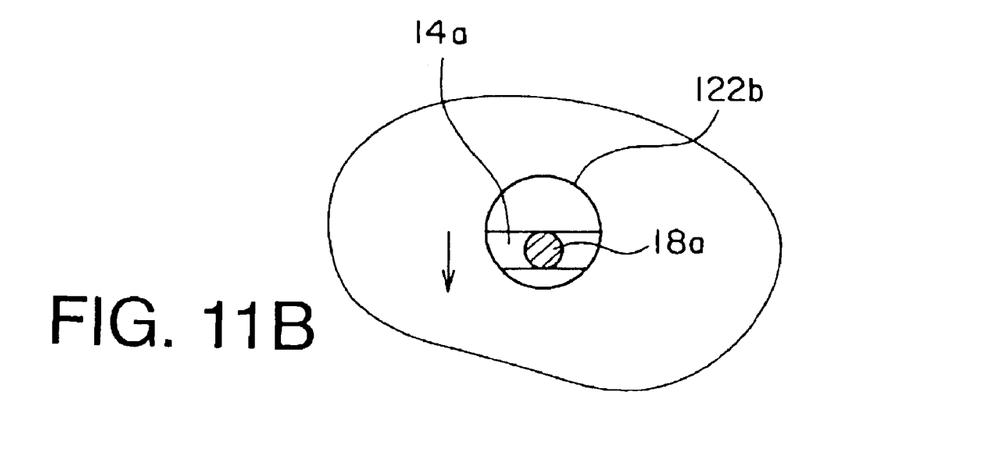

As shown in FIGS. 11A and 11B, by rotating the adjustment jig 18 with the adjustment pin 18a of the adjustment jig 18 inserted in the adjustment groove 14a of the lens holder 14 through the circular hole 122b, it is possible to move the lens holder 14 along an optical axis OA (the direction of the arrow A, a Z direction) in a direction apart from the photo detector PD (FIG. 11A) or in a direction near to the photo detector PD (FIG. 11B).

The lens holder 14 must move in only the direction of the optical axis OA (the Z direction) with the lens holder 14 always slid in the X reference face 124a and the Y reference face 122a.

However, with structure of (the adjustment groove 14a of) the known lens holder 14, it is difficult to move the lens holder 14 in only the Z direction in the manner which will later be described in conjunction with FIGS. 12A and 12B in detail.

Figure 12B:
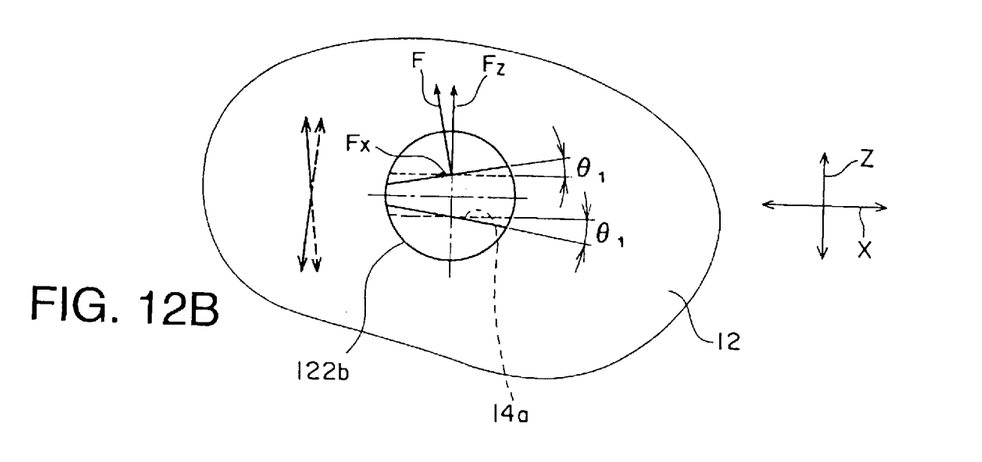
FIG. 12B is a fragmentary view of the part of the known lens holder seen from the bottom side for use in describing the problems of the known lens holder.

More specifically, it is necessary for the adjustment groove 14a of the lens holder 14 to ideally extend along the X direction (the direction perpendicular to the X reference face 124a) in the manner as shown in broken lines in FIG. 12B. However, there is actually a case where the adjustment groove 14a of the lens holder 14 extends in a direction inclined from the X direction at an angle θ 1 caused by errors on manufacturing in the manner as shown in solid lines in FIG. 12B.

In addition, inasmuch as the adjustment groove 14a of the lens holder 14 extends along the X direction, there is a case where a movement direction of the adjustment pin 18a is not coincided with the direction of the optical axis OA (the Z direction) to be moved the lens holder 14 on rotating the adjustment jig 18 inasmuch as the adjustment pin 18a is not co-axial against a center axis of the adjustment jig 18 on structure of the adjustment jig 18 as shown in FIG. 8.

Under such circumstances, force F may act from the adjustment pin 18a to the lens holder 14 in an unintended direction so as to be apart from the X reference face 124a, for example, as shown in F of FIG. 12B.

Such action force F may be decomposed into X component force Fx and Z component force as shown in FIG. 12B. The X component force Fx is force in a direction where the lens holder 14 is apart from the X reference face 124a. Therefore, while the lens holder 14 is moved by the adjustment pin 18a (the force F acts), the lens holder 14 may be apart from the X reference face 124a as shown in an arrow D in FIG. 12A and a backlash (gap) may occur between (the right-hand face 143 of) the lens holder 14 and the X reference face 124a. In this event, a center axis CA of the beam spread lens BSL justly shift from the optical axis OA.

For this phenomenon, an electrical signal obtained by monitoring a position of the beam spread lens BSL by a monitor is discontinuous and it is therefore impossible to adjust the position of the beam spread lens BSL well.

In addition, there is a case where the pressing force f (FIG. 10A) of the presser bar spring 16 cannot overcome statical friction between the Y reference face 122a and the lower face 142 of the lens holder 14. In this event, the backlash shown in FIG. 12A remains as it is. As a result, an optical characteristic of the optical pickup unit is degraded and it is impossible to adjust the position of the beam spread lens BSL.

Figure 13A:
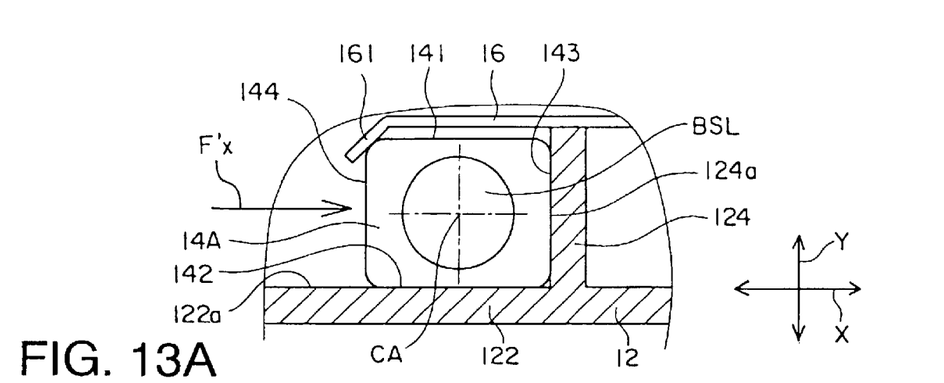
FIG. 13A is a fragmentary section view of a part of a lens holder according to an embodiment of this invention taken in a direction of an arrow B of FIG. 5 for use in describing an arrangement relationship among an optical base, the lens holder, and a presser bar spring.
Figure 13B:
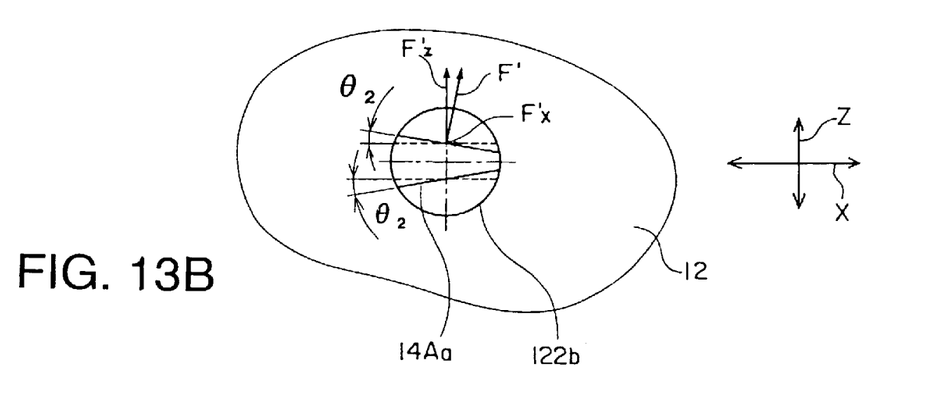
FIG. 13B is a fragmentary view of the part of the lens holder according to the embodiment of this invention seen from a bottom side for use in describing the arrangement relationship between the optical base and the lens holder.
Figure 14:
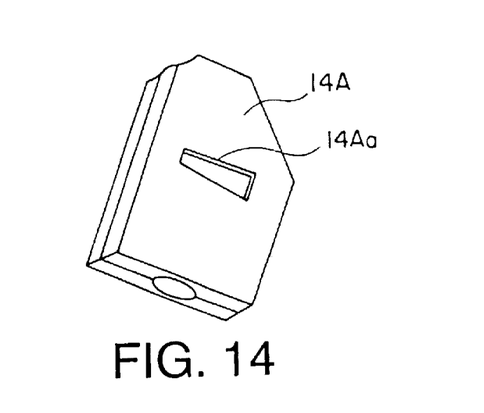
FIG. 14 is a perspective view showing the outside appearance of a lens holder according to an embodiment of this invention.

Referring to FIGS. 13A, 13B, and 14, the description will proceed to a lens holder 14A according to an embodiment of this invention. The lens holder 14A is similar in structure to the known lens holder 14 illustrated in FIGS. 10, 12A and, 12B except that a shape of the adjustment groove is different from each other as will later become clear. The adjustment groove is therefore depicted at 14Aa.

The illustrated adjustment groove 14Aa has a taper shape where a width thereof becomes narrower in proportion to near to the vertical wall 124 and the width thereof becomes wider in proportion to apart from the vertical wall 124 in the manner as shown in solid lines of FIG. 13B.

With the lens holder 14A having the adjustment groove 14Aa of such a structure, force acted from the adjustment pin 18a to the lens holder 14A is always shown at F' in FIG. 13B.

More specifically, action force F' may be decomposed into X component force F'x of the X direction and Z component force F'z. The X component force F'x is force in a direction so as to always bring (press) the lens holder 14A near (against) the X reference face 124a. In the manner which is described above, by forcibly and always acting the pressing force F'x against the X reference face 124a during the position adjustment, it is possible to prevent the center axis CA of the beam spread lens BSL from shifting from the optical axis OA on adjusting the position of the beam spread lens BSL.

While this invention has thus far been described in conjunction with a preferred embodiment thereof, it will now be readily possible for those skilled in the art to put this invention into various other manners. For example, although the above-mentioned embodiment describes as regards an example applied to the beam spread lens as the lens, this invention may be applied to a lens which requires to adjust a position thereof in a direction of an optical axis.

What is claimed is:

1. An optical pickup unit comprising a lens holder installed in an optical base with a lens fitted therein, said optical base comprising a base plate and a vertical wall perpendicularly extending upwards from said base plate, said lens holder being always pressed against a corner portion formed by said base plate and said vertical wall by a presser bar spring, said lens holder having an adjustment groove formed therein, said adjustment groove having a taper shape where a width thereof becomes narrower in proportion to near to said vertical wall and the width thereof becomes wider in proportion to apart from said vertical wall extending in a direction perpendicular to said vertical wall, thereby adjusting a position of said lens by making said lens holder move along an optical axis of a laser beam by moving an adjustment pin through a hole formed in said base plate with said adjustment pin inserted in said adjustment groove.

2. An optical pickup unit as claimed in claim 1, wherein said lens is a concave lens for use in said optical pickup unit.

* * * * *